United States Patent [19]

Kurosawa et al.

[11] Patent Number: 4,566,218
[45] Date of Patent: Jan. 28, 1986

[54] APPARATUS FOR AUTOMATICALLY TRAPPING AND PROCESSING RATS OR THE LIKE

[75] Inventors: Toshishige Kurosawa, Tokyo; Satoru Ishisaka, Yokohama; Kazuki Yasutomi; Takanobu Ishiwatari, both of Kawasaki, all of Japan

[73] Assignee: Ikari Corporation, Tokyo, Japan

[21] Appl. No.: 678,305

[22] Filed: Dec. 5, 1984

[51] Int. Cl.4 ........................................... A01M 23/08
[52] U.S. Cl. ............................................ 43/58; 43/61; 43/99; 43/60
[58] Field of Search ..................... 43/58, 60, 61, 64, 99

[56] References Cited

U.S. PATENT DOCUMENTS

| 1,020,690 | 3/1912 | Frey | 43/58 |
| 2,374,522 | 4/1945 | Andrews | 43/61 |
| 2,541,681 | 2/1951 | Andrews | 43/61 |
| 3,548,447 | 12/1970 | Price | 43/58 X |
| 3,900,983 | 8/1975 | Petrosky | 43/58 |
| 4,062,142 | 12/1977 | Marotti | 43/61 |
| 4,418,493 | 12/1983 | Jordan . | |

Primary Examiner—Nicholas P. Godici
Assistant Examiner—Merv Jordan
Attorney, Agent, or Firm—Flynn, Thiel, Boutell & Tanis

[57] ABSTRACT

An apparatus for automatically trapping and processing rats includes a tube for delivering under suction a trapped rat together with a ball-shaped carrier into a collection tube spaced from a rat entry opening in the tube. The trapped rat is killed by a carbon dioxide gas supplied in the collection tube, and placed in a bag-shaped film which is fused and cut off. Then, the dead rat contained in the bag is discharged.

8 Claims, 11 Drawing Figures

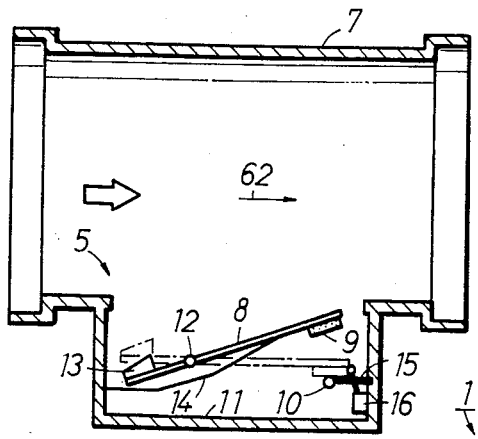
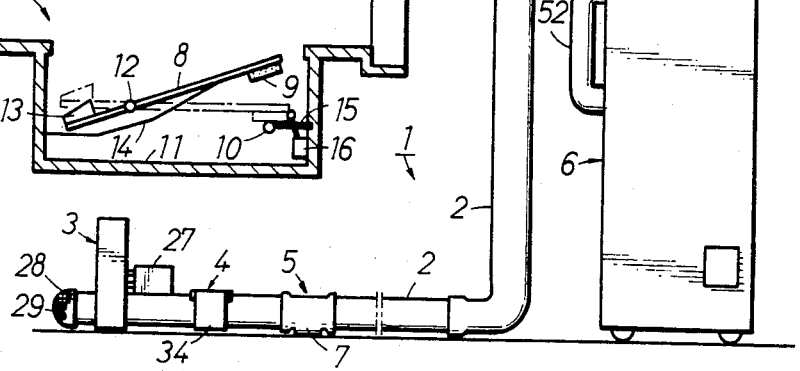
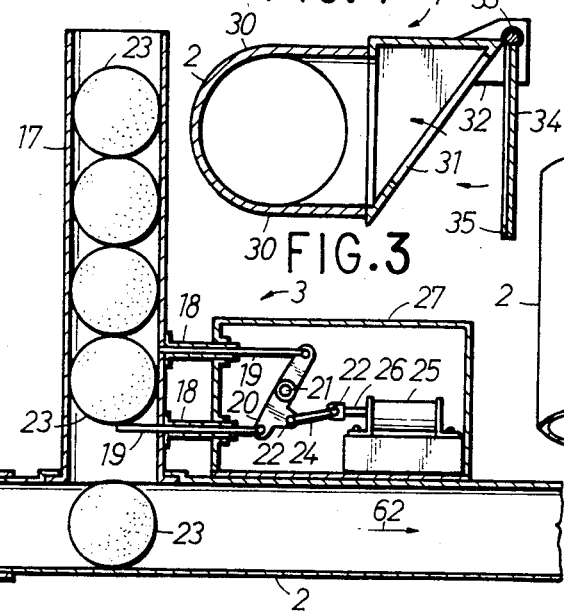
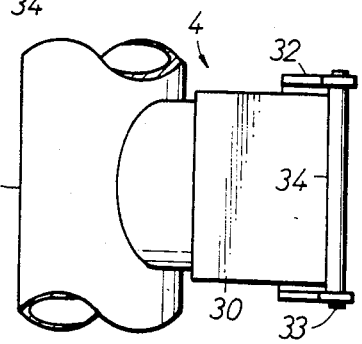

APPARATUS FOR AUTOMATICALLY TRAPPING AND PROCESSING RATS OR THE LIKE

BACKGROUND OF THE INVENTION

The present invention relates to a rat trapping and processing apparatus for trapping rats or the like in their habitat, carrying them on an air flow to a certain position, and discharging them in a packed condition.

Rats are destructive pests serving as vectors of various diseases and destroying foods and other goods.

Methods of getting rid of rats include chemical processes using chemicals and physical processes employing rattraps of adhesive sheets which have recently become available. These processes however are not continuously carried out since an increased expenditure of labor is required to set and retrieve the chemicals, rattraps, or adhesive sheets. The chemical process is disadvantageous in that the chemicals used are dangerous to human beings and rats killed by the chemicals are a source of ticks and bad smells. Some rats are resistant to chemicals, which are hence not effective to kill them. The adhesive sheets will become less effective in trapping rats when the rats get used to the adhesive sheets. It is therefore becoming more and more difficult to get rid of rats especially in complex buildings of today.

SUMMARY OF THE INVENTION

It is an object of the present invention to provide an effective means for trapping, carrying, and processing rats with a view to keeping rat-free environments.

To achieve the above object, a place to process rats is spaced from a place to trap them or their habitat, and trapped rats are carried on an air flow from the trap to the processing site. The delivered rats are killed in the processing site and then packed and discharged. An automatic rat trapping and processing apparatus of the invention may be installed in places such as warehouses and food factories to maintain a rat-free space for a long period of time.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 1 is a side elevational view of an apparatus for automatically trapping and processing rats or the like according to the present invention;

FIG. 2 is a cross-sectional view of a detector;

FIG. 3 is a cross-sectional view of a device for supplying carriers;

FIG. 4 is a cross-sectional view of a device for opening and closing an entry opening;

FIG. 5 is a plan view of the device of FIG. 4;

DESCRIPTION OF THE PREFERRED EMBODIMENT

Figure 6:
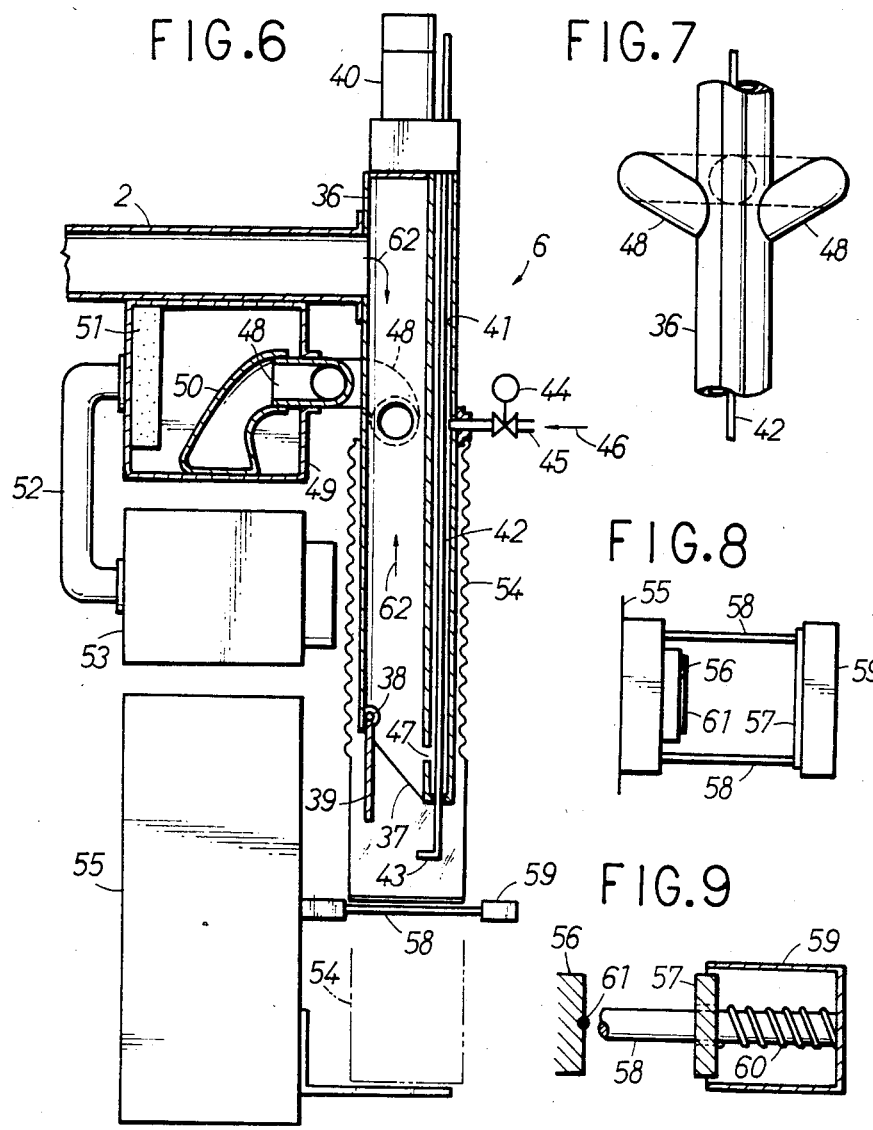
FIG. 6 is a side elevational view, partly in cross section, of a processing device.
Figure 7:
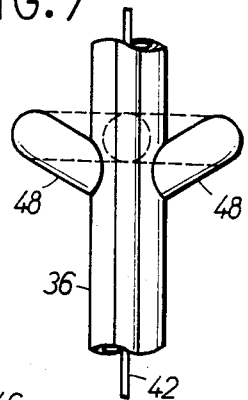
FIG. 7 is a fragmentary front elevational view of a collection tube.
Figure 8:
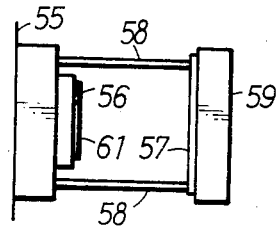
FIG. 8 is a plan view of sealers.
Figure 9:
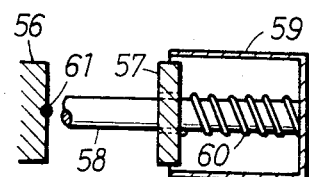
FIG. 9 is a cross-sectional view of a cutter.

FIG. 1 schematically illustrates an apparatus 1 for automatically trapping and processing rats or the like. The apparatus 1 essentially comprises a tube 2, a device 3 for supplying carriers, a device 4 for opening and closing an entry opening, a detector 5, and a processing device 6. The tube 2 defines therethrough a passage for trapping rats and a delivery path for carrying trapped rats on an air flow.

As shown in FIG. 2, the detector 5 is disposed in the tube 2 for detecting the entry of a rat into the tube. The detector 5 has a tubular body 7 connectable to the tube 2, and a treadle 8, a permanent magnet 9, and a reed switch 10, which are all disposed in the tubular body 7. The tubular body 7 has a cavity 11 in its bottom, and the treadle 8 is angularly movably supported in the cavity 11 by a horizontal pivot 12. The treadle 8 has a downwardly inclined end which is located upstream in a direction in which a trapped rat is delivered, and a downstream end urged upwardly by a spring 14 and positioned below the bottom of the tubular body 7. The upstream end of the treadle 8 supports a weight 13 fixed thereto and the downstream end thereof supports the magnet 9 fixed thereto. The reed switch 10, a stopper 15, and a mechanical counter 16 are fixedly disposed in the cavity 11 for coaction with the magnet 9. The magnet 9 is normally located slightly above the bottom of the tubular body 7 under the action of the spring 14. When a rat passes in the direction of the arrow through the tubular body 7, the treadle 8 is turned clockwise about the pivot 12 under the weight of the rat, causing the magnet 9 to turn on the reed switch 10 and increment the counter 16. The counter 16 may be replaced with an electric counter for counting a signal from the reed switch 10 as it is turned on. The treadle 8 is prevented from being turned beyond a desired angular interval through engagement between the stopper 15 and the magnet 9.

The carrier supply device 3 is attached to a distal end of the tube 2 for automatically supplying a carrier 23 into the tube 2 when a trapped rat is to be carried. FIG. 3 shows the carrier supply device 3 in greater detail. The carrier 23 is in the form of a ball as of sponge having a certain weight. A plurality of such carriers 23 are stacked in a tubular holder 17 having a lower end opening into the tube 2. Vertically spaced stopper rods 19 are retractably supported respectively in two horizontal guide sleeves 18 mounted on a side of the holder 17. The stopper rods 19 have front ends facing the interior of the holder 17 and rear ends coupled respectively to the ends of a lever 20. The lever 20 is swingably mounted on a horizontal shaft 21 and coupled by a pin 22 and a link 24 to a plunger rod 26 of a solenoid-operated plunger 25. The solenoid-operated plunger 25, the lever 20 and the parts coupled thereto are covered with a cover 27. To the distal end of the tube 2, there is attached a cap 28 having an air inlet 29 with an air purifying and silencing filter. The air inlet 29 is adjustable in its opening by a shutter or the like. The device 4 for opening and closing the entry opening is disposed in the tube 2 for letting a rat enter the tube 2 to convey the rat on an air flow. As illustrated in FIGS. 4 and 5, the device 4 includes an entry tubular body 30 mounted on the tube 2 so as to provide a T-shaped configuration and defining an entry opening 31 opening obliquely downwardly in a distal end thereof. A pair of spaced brackets 32 is mounted on the tubular body 30 above the entry opening 31. A cover 34 is angularly movably supported by a shaft 33 on the brackets 32. A packing 35 made as of sponge is attached to and along an outer peripheral edge of the cover 34 for sealing the entry opening 31 when the cover 34 is closed.

The automatic processing device 6 is connected to a rear end of the tube 2 for generating a vacuum air flow in the tube 2 to convey a rat having entered the tube 2 with the carrier 23 and for packing a dead rat. The processing device 6 is illustrated in FIGS. 6 through 9. The rear end of the tube 2 is connected to a vertical collection tube 36 having a lower oblique discharge opening 37 in which a bottom plate 39 is openably and closably supported by a shaft 38. A gear motor 40 is mounted on an upper end of the collection tube 36 for controlling vertical movement of a control rod 42 slidably inserted in a hole 41 defined in an outer peripheral wall of the collection tube 36. The control rod 42 has an L-shaped finger 43 on a lower end thereof projecting below the discharge opening 37. A gas tube 45 with a solenoid-operated valve 44 coupled thereto is connected to the hole 41 for supplying a carbon dioxide gas 46 through the hole 41 and a hole 47 into the collection tube 36. To the collection tube 36, there is connected a suction tube 48 branched into a Y-shaped configuration as seen in front elevation, the branches of the suction tube 48 being joined together and opening in a dust box 49 and connected to a bag filter 50. The dust box 49 is connected through a filter 51 of sponge and fibers to a suction tube 52 coupled to a suction pump 53. A tubular film 54 as it is tucked up is fitted over the collection tube 36. The tubular film 54 is employed to pack killed rat and is formed into a bag by a packing machine 55. The packing machine 55 has a pair of sealers 56, 57 positioned below the collection tube 36. One of the sealers 56 is fixed to a body of the packing machine 55, while the other sealer 57 is supported on a pair of horizontal parallel slide rods 58 for movement toward and away from the sealer 56. The sealer 57 is normally urged to move toward the sealer 56 by a compression spring 60 disposed in a case 59. The sealers 56, 57 serve to fuse the film 54 by high-frequency heating or direct heating. The sealer 56 has a cutter 61 secured centrally thereto and in the form of a hot wire for cutting off the film 54 after it has been fused.

Operation of the apparatus of the invention will be described. The tube 2 is placed below a drainboard, in the ceiling, of a place where a wall surface and a floor are joined. Since a rat has a tendency to move randomly or hide behind an object, it enters the tube 2 through the entry opening 31. The rat can more reliably be guided into the tube 2 by placing a source of odor or bait which the rat likes in the tube 2. The rat having entered the tube 2 can freely move therein. When the rat reaches the detector 5 and steps on the treadle 8, the treadle 8 is turned about the pivot 12 to cause the magnet 9 to turn on the reed switch 10 and increment the counter 16. When the reed switch 10 is turned on, the suction pump 53 is actuated to generate a vacuum air flow 62 flowing from the distal end of the tube 2 toward the collection tube 36. The air flow 62 first attracts the bottom plate 39 to close the discharge opening 37, and then closes the cover 34 over the entry opening 31. With the discharge opening 37 and the entry opening 31 thus automatically closed, the air flow 62 goes only through the air inlet 29 into the tube 2. The suction pump 53 is continuously operated for a period of time ranging from 30 to 60 seconds under sequence control. If the air flow 62 is not produced in the time period, then a control unit (not shown) detects such a condition, and automatically stops the suction pump 53 and indicates the malfunction. The carrier supply device 3 has already placed one carrier 23 in the tube 2. When the air flow 62 is generated in the tube 2, the carrier 23 is moved through the tube 2 by the air flow 62 to push the rat in the tube 2, and then the carrier 23 and the rat fall together into the collection tube 36. Although the rat varies in size, the carrier 23 is sized to move freely in the tube 2 and substantially close the passage therein. Therefore, the rat is delivered with the carrier 23 toward the collection tube 36. The air pressure and air flow in the tube 2 can freely be adjusted by adjusting the speed of rotation of the suction pump 53 or the opening area of the air inlet 29. The carrier 23 is effective in keeping the inner surface of the tube 2 clean as well as conveying the rat in the tube 2. Dust or dirt in the tube 2 is deposited on the surface of the carrier 23 or pushed thereby, and collected by the bag filter 50 and the filter 51. Where the carrier 23 contains a sterilizing agent and a rat attracting agent, the inner surface of the tube 2 can be sterilized and rats will more reliably be guided into the tube. When the reed switch 10 is turned on, the gear motor 40 is started to move the control rod 42 upwardly from a lower position to cause the finger 43 to engage the closed bottom plate 39 for thereby preventing the latter from being opened. Therefore, the rat and the carrier 23 drop onto the bottom plate 39 in the collection tube 36. Although the air flow 62 is abruptly turned upwardly as it enters the suction tube 48 from the collection tube 36, the rat and the carrier 23 do not enter the suction tube 48, but fall onto the bottom plate 39 due to inertia. The suction pump 53 is now automatically stopped. Thereafter, the solenoid-operated valve 44 is opened to allow a carbon dioxide gas 46 to flow through the hole 41 and the hole 47 into the collection tube 36. The carbon dioxide gas 46 stays stagnant in the lower end of the collection tube 36 to surround the trapped rat, which will be killed short of oxygen in a short period of time.

When the suction stop 53 is stopped, no vacuum air flow 62 is produced in the tube 2, and the cover 34 is automatically dropped into a vertical position by gravity, thus opening the entry opening 31. The carrier supply device 3 supplies one carrier 23 into the tube 2 in preparation for a next cycle of operation. More specifically, the solenoid-operated plunger 25 is actuated to draw the plunger rod 26 for thereby turning the lever 20 counterclockwise about the shaft 21. Since the lower stopper rod 19 is retracted at this time the lowermost carrier 23 drops into the tube 2. However, the upper stopper rod 19 prevents the second carrier 28 from dropping. Thereafter, the plunger rod 26 is moved forward to turn the lever 20 clockwise into the original position. The upper stopper rod 19 is retracted out of engagement with the carrier 23, and the lower stopper rod 29 is advanced to prevent the carrier 23 from dropping into the tube 2. In this manner, the next carrier 23 is charged into the tube 2 for a next cycle of operation.

The rat in the collection tube 36 will be killed short of oxygen in about 90 seconds. Thereafter, the gear motor 40 is reversed to lower the control rod 42 out of engagement with the bottom plate 39, which opens the discharge opening 37. The control rod 42 engages the bottom of the film 54 and lowers the same. Since the tubular film 54 is in the shape of a bag formed in a previous cycle of packing operation, the rat and the carrier 23 discharged from the discharge opening 37 are placed in the bad-shaped tubular film 54. After the control rod 42 has lowered the film 54 for a length necessary to pack the rat and the carrier 23, the control rod 42 is moved upwardly and stopped in its original position. Subsequently, the packing machine 55 retracts the slide rods 58 to move the movable sealer 57 against the fixed sealer 56 to fuse the film 54 as through high-frequency heating, thereby forming a sealed bag of the film 54 containing the carrier 23 and the rat. After the sealers 56, 57 have fused the film 54, the cutter 61 melts off the film 54 in the sealed position thereon. Therefore, the bag-shaped film 54 as it accommodates the dead rat and the carrier 23 drops into a storage container, for example. Thus the series of steps of operation from the trapping of the rat to the packing of the rat is finished. The series of steps is effected under programmed sequence control with mechanical movements detected by limit switches.

Figure 10:
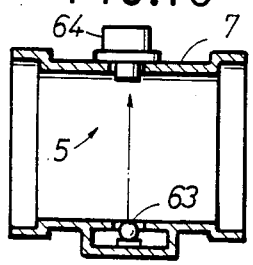
FIG. 10 is a cross-sectional view of a detector according to another embodiment.
Figure 11:
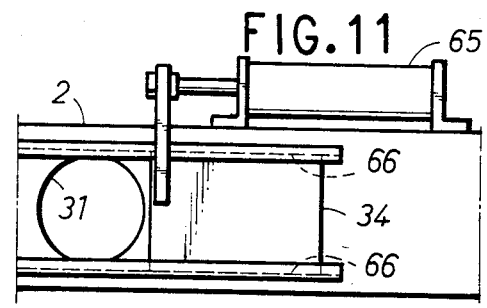
FIG. 11 is a side elevational view of a device for moving an entry opening along guide grooves.

While in the illustrated embodiment the single tube 2 is connected to the processing device 6, a plurality of branched tubes 2 may be connected and hence a plurality of carrier supply devices 3, a plurality of devices 4 for opening and closing entry openings, and a detector 5 may be coupled to the processing device 6. With such an alternative, the suction pump 53 is required to produce a suction force large enough to draw carriers 23 and rats and close the covers 34 over the entry openings 31 and the bottom plates 39 over the discharge openings 37. The detector 5 may comprise a light source 63 and a photoelectric or thermal sensor 64 positioned in confronting relation in the tube 2 as shown in FIG. 10. Where the photoelectric sensor 64 is used, it produces a signal when a trapped rat interrupts a beam of light emitted from the light source 63. In case the thermal sensor 64 is employed, it is actuated by sensing the body temperature of a trapped rat. Although the cover 34 has been described as being automatically closable under suction, the cover 34 may be horizontally movable along guide grooves 66 on an outer surface of the tube 2, as shown in FIG. 11. When a rat has been entered, the cover 34 is moved by an air cylinder 65 in a direction to close the entry opening 31. While the present invention has been developed with a view to trapping and processing rats, the apparatus of the invention may also be employed to trap and process small animals other than rats.

The present invention is advantageous for the following reasons: Since the rat entry opening of the apparatus can be installed beneath a drainboard or an article support base, in the ceiling or a corner, it does not take up a large space, and can reliably trap rats due to their behavior. As the apparatus can be positioned as part of installations in a warehouse, a food manufacturing factor, or the like for a long period of time, the rate of trapping rats is increased, and the apparatus is in continuous use over a prolonged interval of time. Since a trapped rat is forcibly conveyed quickly on an air flow to a processing position, other untrapped rats are not alerted, and hence a continuous trapping operation can be effected for a long period of time. Furthermore, trapped rats are processed and packed in a sanitary condition, without involving a complex process, so that rats or the like can be exterminated in a clean and sanitary environment.

Although a certain preferred embodiment has been shown and described, it should be understood that many changes and modifications may be made therein without departing from the scope of the appended claims.

What is claimed is:

1. An apparatus for automatically trapping and processing rats or the like, comprising:
   (a) a tube defining a passage and a delivery path and having an entry opening for rats or the like;
   (b) first means mounted on an end of said tube for supplying a spherical carrier into said tube when a rat or the like is to be delivered through said delivery path;
   (c) second means mounted in said entry opening for closing the same when the rat or the like has entered into said passage in the tube;
   (d) third means mounted on said tube for detecting the entry of the rat or the like into said tube; and
   (e) fourth means connected to an opposite end of said tube for generating a vacuum air flow in said tube for delivering the rat or the like and the carrier into a bag-shaped film and closing the bag-shaped film.

2. An apparatus according to claim 1, wherein said second means comprises a cover closable over said entry opening under a vacuum developed in said tube.

3. An apparatus according to claim 1, wherein said second means comprises a cover positioned at said entry opening and movable along guide grooves on said tube, and an air cylinder operatatively connected to said cover and actuatable in a direction to close said entry opening when the rat or the like enters said entry opening.

4. An apparatus according to claim 1, wherein said third means comprises a treadle swingably mounted in said tube, a permanent magnet mounted on said treadle, and a reed switch for detecting a displacement of said permanent magnet.

5. An apparatus according to claim 1, wherein said third means comprises a light source and a photoelectric sensor positioned in confronting relation in said tube.

6. An apparatus according to claim 1, wherein said third means comprises a thermal sensor positioned in said tube.

7. An apparatus according to claim 1, wherein said first means comprises a tubular holder mounted on said tube for accommodating a stack of spherical carriers, a first stopper rod for holding a lowermost carrier in said holder, a second stopper rod positionable between said lowermost carrier and a second following carrier for temporarily holding the second following carrier in said holder, and a solenoid-operated plunger for alternately moving said first and second stopper rods into and out of said holder.

8. An apparatus according to claim 1, wherein said fourth means comprises a suction pump connected to said opposite end of said tube, a collection tube connected to said suction pump and said opposite end of said tube for holding a tubular bag-shaped film, a pair of sealers disposed below said collection tube for fusing a lower end of said tubular bag-shaped film, and a control rod movably mounted in said collection tube for feeding said tubular bag-shaped film.

* * * * *